United States Patent
Joest

(10) Patent No.: US 12,330,786 B2
(45) Date of Patent: Jun. 17, 2025

(54) FASTENING SYSTEM, MONUMENT AND METHOD FOR ATTACHING A FIXTURE TO A MONUMENT

(71) Applicant: Airbus Operations GmbH, Hamburg (DE)

(72) Inventor: Henning Joest, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 935 days.

(21) Appl. No.: 17/218,732

(22) Filed: Mar. 31, 2021

(65) Prior Publication Data
US 2021/0309343 A1 Oct. 7, 2021

(30) Foreign Application Priority Data
Apr. 2, 2020 (DE) .......................... 102020109188.5

(51) Int. Cl.
*B64D 11/00* (2006.01)
*F16B 5/02* (2006.01)
*F16B 5/07* (2006.01)

(52) U.S. Cl.
CPC ............ B64D 11/0015 (2013.01); *F16B 5/02* (2013.01); *F16B 5/07* (2013.01)

(58) Field of Classification Search
CPC ........ F16B 5/0032; F16B 5/0036; F16B 5/02; F16B 5/07; Y10T 403/7045; Y10T 403/7092; B64D 11/00; B64D 11/0015; B64D 11/00151; B64D 11/00152; B64D 11/00153; B64D 11/02; B64D 11/04; B64D 2045/007

USPC ......................................................... 403/380
See application file for complete search history.

(56) References Cited

U.S. PATENT DOCUMENTS

| | | | | |
|---|---|---|---|---|
| 4,647,980 A * | 3/1987 | Steventon | ........ | B64D 11/00155 348/839 |
| 5,529,265 A * | 6/1996 | Sakurai | ............ | B64D 11/00155 244/118.6 |
| 6,561,600 B1 * | 5/2003 | Seeley | ................ | B60R 11/0235 312/257.1 |

(Continued)

FOREIGN PATENT DOCUMENTS

| DE | 102018205267 A1 | 10/2019 |
|---|---|---|
| DE | 102018205268 A1 | 10/2019 |

*Primary Examiner* — Josh Skroupa
*Assistant Examiner* — Kevin J Baynes
(74) *Attorney, Agent, or Firm* — Greer, Burns & Crain, Ltd.

(57) ABSTRACT

A fastening system to attach a fixture to a monument installed in a passenger cabin including a wall portion of the monument having at least one first fastening element; and a frame having at least one second fastening element and which is configured to cover the fixture, at least in part, in a fastened state. The first and second fastening elements are configured to engage with one another and be movable relative to one another in a pre-assembled state, and to fix one another in the fastened state. The fastened state can be produced in that, in the pre-assembled state, the frame is moved relative to the wall portion in a fastening direction extending at least substantially parallel to a main extension plane of the wall portion. A method for attaching a fixture to a monument provided for installation in a passenger cabin via a fastening system is provided.

14 Claims, 5 Drawing Sheets

(56) References Cited

U.S. PATENT DOCUMENTS

| | | | | |
|---|---|---|---|---|
| 7,040,697 | B1* | 5/2006 | Tuccinardi | B60N 2/879 |
| | | | | 297/217.3 |
| 7,621,593 | B2* | 11/2009 | Dickinson | B60N 3/004 |
| | | | | 297/188.05 |
| 9,360,895 | B2* | 6/2016 | Shah | H05K 7/12 |
| 9,506,489 | B2* | 11/2016 | Ko | F16B 12/24 |
| 9,617,002 | B2* | 4/2017 | Hommel | B64D 11/06 |
| 9,651,195 | B2 | 5/2017 | Chang et al. | |
| 9,759,250 | B2* | 9/2017 | Anseth | F16B 5/0056 |
| 11,365,006 | B2* | 6/2022 | Chavarria | B64D 11/0606 |
| 2011/0297805 | A1* | 12/2011 | Jager | H05K 5/0204 |
| | | | | 29/428 |
| 2013/0094168 | A1* | 4/2013 | Jaeger | H05K 5/0204 |
| | | | | 361/807 |
| 2019/0308727 | A1 | 10/2019 | Riedel et al. | |
| 2019/0308729 | A1 | 10/2019 | Riedel et al. | |

\* cited by examiner

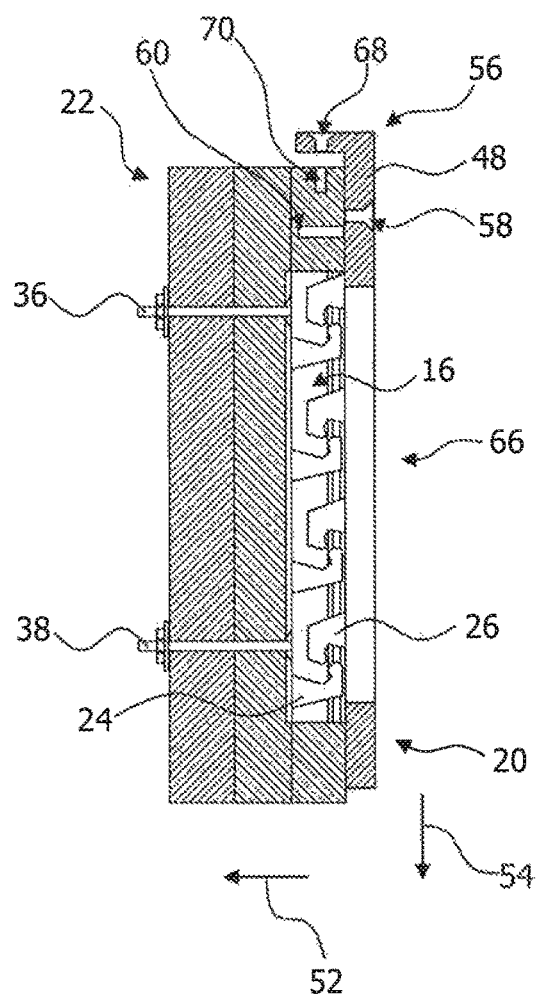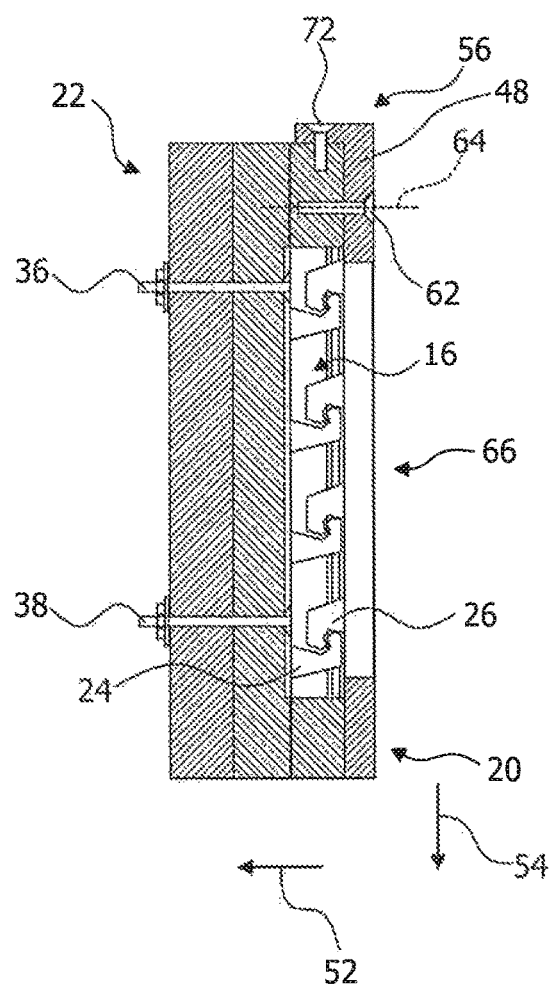
Fig. 3                    Fig. 4

FASTENING SYSTEM, MONUMENT AND METHOD FOR ATTACHING A FIXTURE TO A MONUMENT

CROSS-REFERENCES TO RELATED APPLICATIONS

This application claims the benefit of the German patent application No. 102020109188.5 filed on Apr. 2, 2020, the entire disclosures of which are incorporated herein by way of reference.

FIELD OF THE INVENTION

The present invention relates to monuments used in aircraft, and more particularly, to a fastening system for fastening a fixture to such a monument, the monument itself, and a method for attaching a fixture to such a monument.

BACKGROUND OF THE INVENTION

In aircraft cabins such as passenger cabins of aircraft, what are known as monuments are installed. In this case, these are modules having various functionalities which can be installed at different points in the cabin and form, for example, galleys, sanitary facilities or other interior furnishings.

Fixtures such as displays, display panels or the like can be attached to wall portions of such monuments. In this case, frames which are screwed to the wall portions from the front are conventionally used and act as a cover for edge regions of the attached fixture. Frames of this type often protrude beyond the corresponding monument to a considerable extent and do not finish flush therewith, which firstly leads to an uneven visual appearance and secondly produces corners and edges on which people can get caught. In addition, screws used for fastening are visible and thus not protected against access by unauthorized persons. During fastening, the frame must be positioned correctly and supported in the process; an installation is often relatively laborious. If maintenance work is to be carried out on a fixture once installed, or the fixture is to be replaced, the frame has to be unscrewed. In addition, fastenings of the fixture, for example screws, by which this fixture is screwed to the wall portion of the monument, have to be released. In particular, in many cases, a rear side of the fixture has to be accessed, since connections for connecting to on-board electronics are arranged thereon. Maintenance on fixtures can therefore be very time-consuming and labor-intensive.

SUMMARY OF THE INVENTION

Proceeding from the prior art, one problem addressed by the present invention comprises providing a fastening system for attaching a fixture to a monument, which system allows easy maintenance and secure fastening of the fixture. Another problem addressed by the present invention comprises specifying a corresponding method for attaching a fixture to a monument.

One aspect of the invention relates to a fastening system for attaching a fixture such as a display, a display unit, a light module, a touch screen or the like to a monument, in particular to an aircraft monument, provided for installation in a passenger cabin, in particular, an aircraft cabin. The fastening system comprises a wall portion of the monument which has at least one first fastening element, and a frame, which has at least one second fastening element and which is configured to cover the fixture, at least in part, in a fastened state. The first fastening element and the second fastening element are configured to engage with one another and be movable relative to one another in a pre-assembled state, and to fix one another in the fastened state, wherein the fastened state can be produced in that, in the pre-assembled state, the frame is moved relative to the wall portion in a fastening direction which extends at least substantially parallel to a main extension plane of the wall portion.

Another aspect of the invention relates to a method for attaching a fixture such as a display, a display unit, a light module, a touch screen or the like to a monument, in particular to an aircraft monument, provided for installation in a passenger cabin, in particular, an aircraft cabin, by means of a fastening system which comprises a wall portion of the monument, which has at least one first fastening element, and a frame, which has at least one second fastening element and is configured to retain the fixture at least in part in a fastened state. In this case, this can be a fastening system according to the invention. The method comprises the step of producing a pre-assembled state in which the first fastening element and the second fastening element engage with one another and are movable relative to one another. The method further comprises the step of moving the frame in the pre-assembled state relative to the wall portion in a fastening direction which extends at least substantially parallel to a main extension plane of the wall portion to produce the fastened state in which the first fastening element and the second fastening element fix one another.

The invention further relates to a monument, in particular an aircraft monument, provided for installation in a passenger cabin, in particular, an aircraft cabin, comprising a fastening system according to the invention and a fixture which is attached by means of the fastening system.

The invention further relates to a cabin region comprising a monument according to the invention and to an aircraft comprising a monument according to the invention.

By means of this invention, advantageous properties with respect to fastening a fixture to a monument are achieved. A fastening system and a method which provide rapid and reliable fastening and/or easy and fast access for the purpose of maintenance of a fixture can be provided. In addition, it can be ensured in a simple manner that the frame ends flush with the wall portion. According to the invention, narrow frames can be used which manage without portions which are configured for attachment by means of screws or the like, by means of which an available surface area for the fixture can be maximized. A high degree of flexibility with respect to an external appearance of the frame can be achieved while simultaneously maintaining functionality, by means of which the frame can be adapted to the corresponding fixture, and a uniform overall aesthetic impression can be achieved. Furthermore, a fastening is achieved which protects the monument and the fixture against access by unauthorized persons, in particular, since the fastening elements cannot be accessed.

The first fastening element can be permanently attached to the wall portion. The first fastening element can be formed integrally with the wall portion and/or with a component thereof. The second fastening element can be permanently attached to the frame. The second fastening element can be formed integrally with the frame and/or with a component thereof.

The engagement of the fastening elements in one another can include the first fastening element and the second fastening element overlapping one another at least in some portions, in particular when viewed parallel to the main extension plane of the wall portion.

The wall portion can comprise a plurality of first fastening elements. The frame can comprise a plurality of second fastening elements. A number of first fastening elements can correspond to a number of second fastening elements. In each case, one of the first fastening elements can be assigned to one of the second fastening elements respectively.

The main extension plane of the wall portion can be defined by a surface normal to the wall portion. The main extension plane of the wall portion can be arranged parallel to a greatest lateral surface of a smallest imaginary cuboid completely surrounding the wall portion. In a state of the monument in which this monument is installed in a cabin, for example in an aircraft cabin, the main extension plane extends, for example, perpendicularly to a cabin floor.

According to one embodiment, in the fastened state, the first fastening element and the second fastening element prevent a movement of the frame relative to the wall portion in a direction which is perpendicular to the main extension plane of the wall portion. Preferably, the fastening elements define a single fastening direction. In this case, the fastening elements can be formed in such a way that, starting from the pre-assembled state at least after a movement of the frame in the fastening direction over a predetermined distance, only a linear movement of the frame is possible.

The wall portion can comprise a region for receiving the fixture. The fixture can be embedded, for example, in part or in full in the wall portion. The receiving region can be a recess for the fixture. In other embodiments, the wall portion can be planar, and the fixture can be merely placed on the wall portion.

The fastening direction can extend parallel to a floor surface of the monument or parallel to a cabin floor. In other embodiments, the fastening direction can extend perpendicularly to a floor surface of the monument or parallel to a cabin floor. An obliquely extending fastening direction can also be provided in some embodiments.

The method according to the invention can comprise method steps which are used for the actuation, assembly, fastening, release or basically the handling of the described elements and components of the fastening system. Likewise, the fastening system or specific elements and components thereof can be configured to allow the described method steps to be carried out.

A simple assembly of the frame, which allows a precise arrangement or fitting of the frame and subsequent fastening, can be achieved, in particular, when the first fastening element and the second fastening element are configured to allow the pre-assembled state to be produced in that the frame is moved towards the wall portion in an assembly direction which extends substantially perpendicularly to the main extension plane of the wall portion. The wall portion and/or the frame can comprise a guide means which guides the frame during a movement in the assembly direction.

A fastening which is loadable and easy to produce can be achieved, for example, when, in the fastened state, the first fastening element engages behind the second fastening element and/or the second fastening element engages behind the first fastening element. Preferably, engaging-behind is produced firstly by moving the frame in the fastening direction and is not yet present, for example, in the pre-assembled state.

The first fastening element can be in the form of a hook element. Alternatively or additionally, the second fastening element can be in the form of a hook element. As a result, a fastening which is reliable, easy to produce and easy to release can be achieved. In addition, a geometry of the fastening elements can be adapted in a simple manner when a specific movability is desired for pre-assembly and/or for fastening. In some embodiments, both the first fastening element and the second fastening element can be in the form of corresponding hook elements which engage in one another in the fastened state. In this case, the movement of the frame in the fastening direction can hook the fastening elements together. In other embodiments, the first fastening element or the second fastening element can be in the form of a slot, hole, opening, recess or the like, wherein the corresponding other fastening element engages in the first or second fastening element at least in the fastened state. Preferably, in this case, the wall portion has a planar design and comprises a recess as a first fastening element. For example, to produce the pre-assembled state, one fastening element is inserted in the other by moving the frame in the assembly direction, and in particular, by displacing the frame in the fastening direction, the first fastening element and the second fastening element are subsequently hooked together.

According to another embodiment, the first fastening element and the second fastening element can be configured to be released from one another in that, starting from the fastened state, the frame is moved relative to the wall portion counter to the fastening direction. The first fastening element and the second fastening element can be provided with latching elements which establish a snap-fit in the fastened state. Releasing the fastening elements from one another can then require a corresponding latching force to be overcome. In other embodiments, starting from the fastened state, the frame can be moved counter to the fastening direction with substantially no resistance. Preferably, the fastening of the frame to the wall portion can be released without causing damage and in particular without using any tools.

The frame can be configured to retain the fixture at least in part or in full, as a result of which additional fastenings of the fixture to the wall portion can be dispensed with. For example, the frame can retain the fixture in the receiving region. The frame can exert a retaining force on the fixture which counteracts a gravitational force. Alternatively or additionally, the frame can prevent tilting of the fixture. According to some embodiments, the frame can form a region for receiving the fixture. The fixture or at least a component thereof can be fastened to the frame. Furthermore, the frame can be formed integrally with the fixture or at least with a component thereof. In some exemplary embodiments, the fixture can be unfastened from the wall portion.

Securing the frame in a targeted manner, which prevents, for example, access by unauthorized persons, can be achieved, for example, when the fastening system further comprises a locking unit which, in a locked state, is configured to prevent a release of the fastened state and, in a release state, is configured to allow a release of the fastened state. The locked state is present, in particular, in the fastened state. According to the invention, it can be provided that, starting from the locked state, it is not possible to release the fastened state without causing damage. The locking unit can be configured to prevent a movement of the frame counter to the fastening direction in the locked state. The frame can thus be prevented from moving at all in the locked state firstly by the fastening elements fixing one another and secondly by the locking unit.

According to one development, it can be provided that the locking unit comprises at least one blocking element which, in the locked state, mechanically prevents a movement of the frame relative to the wall element. The blocking element can be configured to absorb a force acting on the frame parallel to the fastening direction. In the locked state, the blocking element is preferably stationary relative to the wall portion and relative to the frame. The blocking element can be a pin, a peg, a rod, a square, a locking pawl or another suitable mechanical component. Preferably, the blocking element is made of metal, for example steel. The blocking element can be formed separately from the wall portion and/or from the frame. In other embodiments, the blocking element can also be formed integrally with the frame or with the wall portion. Preferably, the blocking element extends perpendicularly to the fastening direction in the locked state. In some embodiments, the blocking element can be biased in such a way that it automatically moves into a locking position when the frame is moved in the fastening direction in order to produce the fastened state.

The frame can have a first opening, and the wall portion can have a second opening which aligns with the first opening in the fastened state, wherein the blocking element extends through the first opening and the second opening at least in part in the locked state. As a result, locking can be produced in a mechanically simple but reliable manner. The frame and/or the wall portion can comprise a lug which is provided with the corresponding opening.

According to one development, the locking unit has an actuation mechanism having an actuation member arranged at a distance from the blocking element and a force transmission mechanically coupling the actuation member to the blocking element, wherein the blocking element can be moved by means of the actuation member. A development of this type allows simple assembly and disassembly of the frame and thus easy and rapid maintenance of the fixture. For example, the actuation member can be linearly movable to actuate the locking unit. The actuation member can be arranged behind a cover of the frame and/or of the wall portion so that it is not visible from outside. It can thus remain hidden from unauthorized persons as to how the frame is to be released. The force transmission can comprise a cable, in particular a Bowden cable, and/or a compression member and/or a pressure-actuation cable. The actuation member can be in the form of a hand grip. According to one embodiment, the actuation mechanism is part of the wall portion and/or the monument. In other embodiments, the actuation mechanism can also be part of the frame.

High ease of use and/or low susceptibility to operating errors can then be achieved, in particular, when the actuation member is biased into a locking position by means of a spring element. It can be necessary to move the actuation member against a spring tension of the spring element to release the locking. The actuation member can be biased towards the wall portion and/or the frame.

Furthermore, it can be provided that, in the fastened state, the frame covers the fastening elements and, in particular, the locking unit in an opaque manner. For example, when viewed perpendicularly to the main extension plane of the wall portion or perpendicularly to a surface such as a display surface of the fixture, the frame can hide the fastening elements, the locking unit and the actuation member.

If the fastening system comprises an actuation member, an additional screen can be provided which is arranged next to the frame and/or above the frame and is fastened, for example, to the wall portion. The screen can cover the actuation member and, in particular, additional components of the locking unit.

According to one embodiment, corresponding connecting elements, such as plugs and sockets, can be formed on the fixture and on the wall portion. Preferably, the connecting elements are configured, for example are geometrically adapted to one another, in such a way that a connection is immediately produced when the fixture is inserted in and/or plugged into the receiving region.

BRIEF DESCRIPTION OF THE DRAWINGS

Preferred embodiments of the invention will now be described in greater detail with reference to the accompanying schematic drawings, in which

FIG. 3 is a sectional view of the fastening system in a pre-assembled state;

FIG. 4 is a sectional view of the fastening system in a fastened state;

DETAILED DESCRIPTION OF THE PREFERRED EMBODIMENTS

Figure 1:
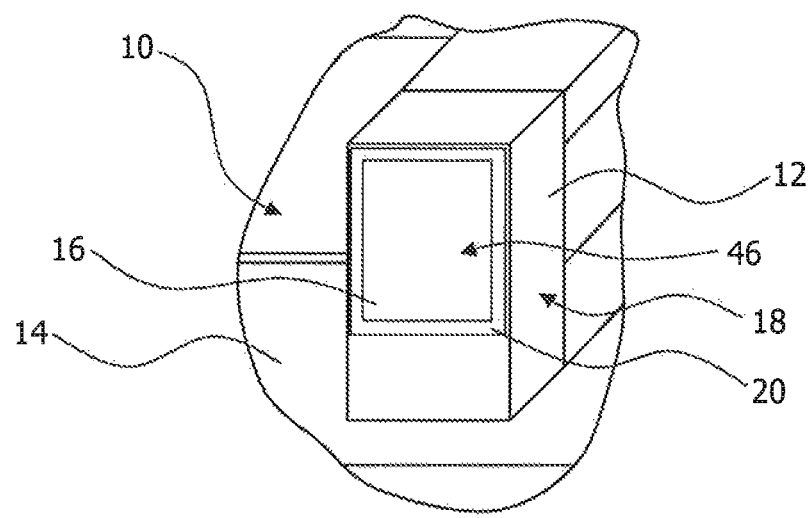
FIG. 1 shows a cabin region comprising a monument which has a fastening system according to the invention for attaching a fixture.
Figure 11:
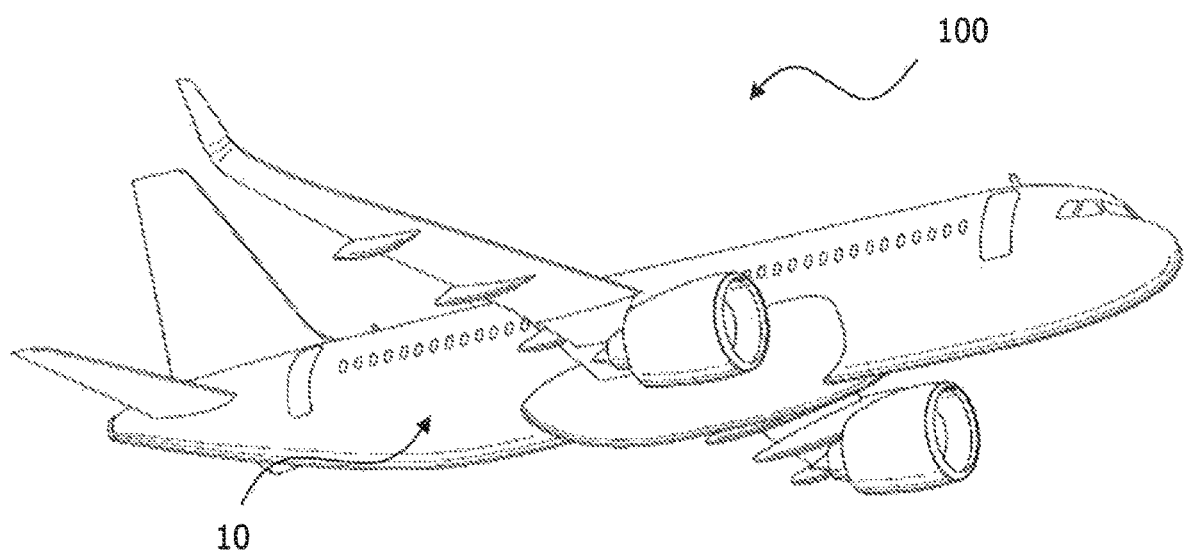
FIG. 11 shows an aircraft which is equipped with a cabin region according to FIG. 1.

FIG. 1 shows a cabin region 10 of an aircraft such as a passenger aircraft 100 illustrated in FIG. 11. A monument 12 which is installed on a cabin floor 14 and connected thereto is arranged in the cabin region 10. The monument 12 is, for example, a kitchen module for a passenger cabin. A fixture 16, which, in the example shown, is in the form of an OLED display, is attached to the monument 12. As has been mentioned above, however, other fixtures 16 are also conceivable according to the invention.

The fixture 16 is attached by means of a fastening system 18. The fastening system 18 comprises a frame 20 and a wall portion 22 of the monument. The frame 20 covers the fixture 16 in the edge region thereof. This results in the impression that the fixture 16 is integrated in the monument 12.

Figure 2:
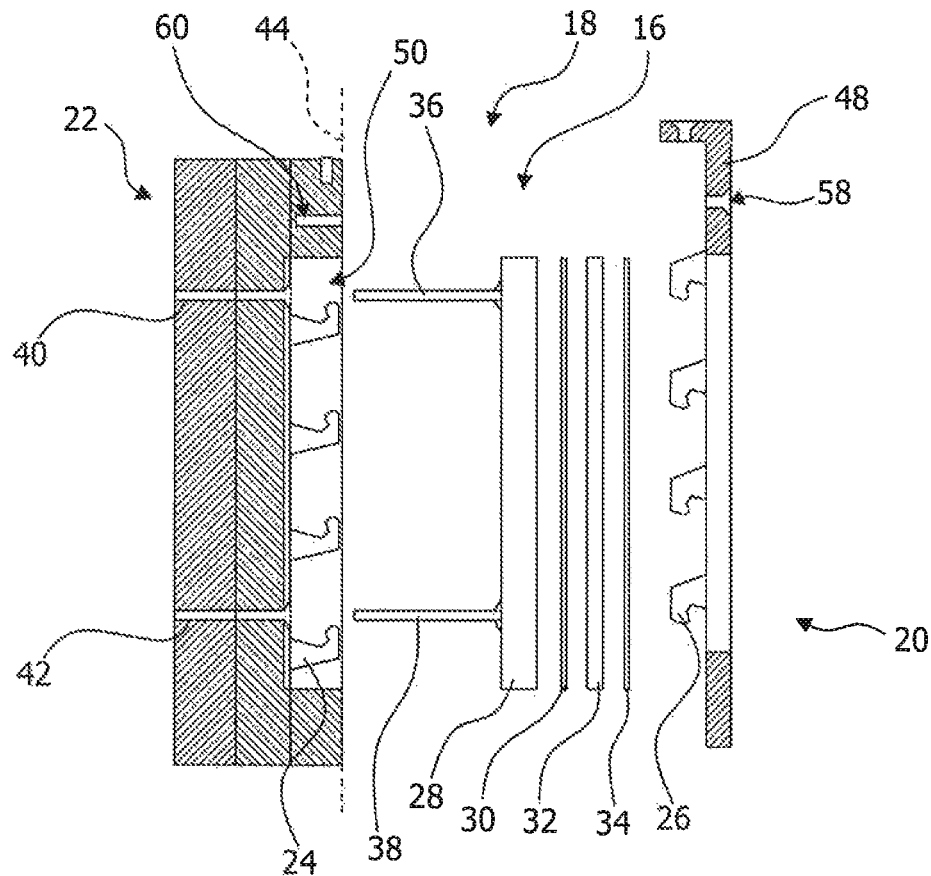
FIG. 2 is a sectional view of the fastening system in an exploded view.

FIG. 2 is a sectional view of the fastening system 18 in an exploded view. The wall portion 22 comprises a first fastening element 24. In the case shown, the wall portion 22 comprises a plurality of first fastening elements 24 which, for the sake of clarity, are not all provided with reference signs.

Furthermore, the frame 20 comprises a second fastening element 26. In the case shown, the frame 20 comprises a plurality of second fastening elements 26 which, for the sake of clarity, are not all provided with reference signs.

In the case shown by way of example, the fixture 16 comprises an OLED array 28, a seal 30 which is connected thereto, a protective cover 32 and strips 34 made of PTFE (polytetrafluoroethylene), by means of which the fixture 16 can be connected to the frame 20.

The fixture 16 further comprises connection members 36, 38 which can be introduced into corresponding receptacles 40, 42 of the wall portion 22 and by means of which the fixture 16 can be fastened to the wall portion 22. The connection members 36, 38 can comprise, for example, threaded rods or screws.

The wall portion 22 defines a main extension plane 44 which, in an installed state of the monument 12 and in a fastened state of the fixture 16, extends perpendicularly to the cabin floor 14 and parallel to an outwardly facing surface 46 (cf. FIG. 1) of the fixture 16.

The frame 20 comprises a screen 48 which, in a fastened state of the fixture 16, covers the fastening elements 24, 26.

The fixture 16 can comprise, for example on a rear side, a connection for connecting to an on-board network (not shown).

In the following, reference is additionally made to FIGS. 3 and 4. FIG. 3 is a sectional view of the fastening system 18 in a pre-assembled state. FIG. 4 is a sectional view of the fastening system 18 in the fastened state.

Firstly, the fixture 16, if necessary, is connected to an on-board network. When connecting the fixture 16, the fixture 16 is firstly arranged in a receiving region 50 of the wall portion 22. The fixture 16 is then fastened to the wall portion 22 by means of the connection members 36, 38. The connection by means of nuts which is shown is to be understood purely by way of example. Alternatively, screws, or other suitable fastening means, can also be used as connection members which are screwed directly into corresponding holes in a wall portion.

Subsequently, the frame 20 is installed and fastened to the wall portion 22. For this purpose, starting from a released state, the frame 20 is firstly moved towards the wall portion 22 in an assembly direction 52. In this case, the assembly direction 52 is perpendicular to the main extension plane 44 of the wall portion 22. The pre-assembled state in which the frame 20 is already resting on the wall portion 22 is thereby produced.

Starting from the pre-assembled state, the frame 20 is moved in a fastening direction 54 which extends parallel to the main extension direction 44. In the case shown, the fastening direction 54 extends perpendicularly to the assembly direction 52.

The fastening elements 24, 26 are in the form of hook elements. In the fastened state, the fastening elements 24, 26 engage behind one another. By contrast, engaging-behind is not yet present in the pre-assembled state, but rather is first produced by moving the frame 20 in the fastening direction 54. In the fastened state, the fastening elements 24, 26 fix one another and thus prevent a movement of the frame 20 relative to the wall portion 22 parallel to the assembly direction 52.

The fastening system 18 further comprises a locking unit 56 which, in a locked state, is configured to prevent a release of the fastened state and, in a released state, is configured to allow a release of the fastened state. According to the current exemplary embodiment, the locking unit 56 comprises a first opening 58 in the frame 20, and a second opening 60 in the wall portion 22. In the fastened state, the first opening 58 is aligned with the second opening 60. Furthermore, the locking unit 56 comprises a blocking element 62 which extends through the first opening 58 and the second opening 60 in the locked state. In this case, the blocking element 62 is in the form of a screw, by means of which the frame 20 is fastened to the wall portion 22. In the locked state, the blocking element 62 mechanically prevents a movement of the frame 20 relative to the wall portion 22.

A longitudinal axis 64 of the blocking element 62 extends perpendicularly to the fastening direction 54. In the locked state, the blocking element 62 thus absorbs a force acting on the frame 20 parallel to the fastening direction 54 and thus, together with the fastening elements 24, 26, prevents a movement of the frame 20 relative to the wall portion 22.

The blocking element 62 is introduced through the first opening 58 and the second opening 60 from a front side 66 of the frame 20. In addition, for this purpose, in the current exemplary embodiment, the locking unit 56 comprises an additional first opening 68, an additional second opening 70 and an additional blocking element 72 which is formed analogously to the blocking element 62, but is introduced into the openings 68, 70 from an upper side 74 of the frame 20.

If maintenance is to be carried out on the fixture 16, or if access thereto is necessary for other reasons, the frame 20 can be removed from the wall portion 22 again without causing any damage. For this purpose, the locking is firstly released by removing the blocking elements 62, 72. Subsequently, the fastening elements 24, 26 are released from one another in that, starting from the fastened state, the frame 20 is moved relative to the wall portion 22 counter to the fastening direction 54. As a result, the fastening elements 24, 26 are no longer engaged behind one another, and in a subsequent step, the frame 20 can be removed counter to the assembly direction 52.

Additional embodiments of the invention are described in the following. Lower case letters are added to the reference signs of these embodiments. In this case, the same reference signs are used for similar or like elements. Mainly differences from the first exemplary embodiment are described. With respect to the function and design of similarly or identically formed elements, reference is therefore made to the description above. In addition, for the sake of clarity, not all elements, but rather only the elements mentioned, are provided with reference signs.

Figure 5:
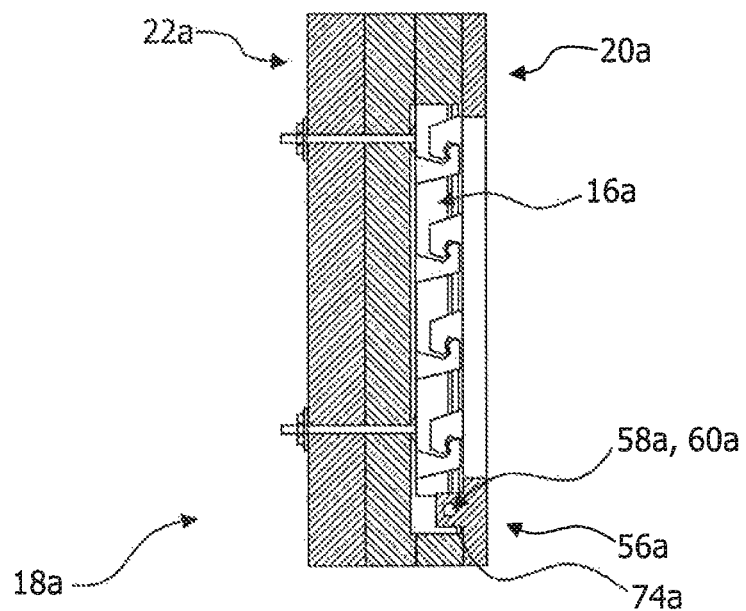
FIG. 5 is a sectional view of a fastening system according to a second embodiment.

FIG. 5 is a sectional view of a fastening system 18*a* according to a second embodiment. The fastening system 18*a* likewise comprises a wall portion 22*a* of a monument (not shown) and a frame 20*a* and is configured to attach a fixture 16*a* to the monument.

The fastening system 18*a* differs from the fastening system 18 according to the exemplary embodiment above in terms of the design of the locking unit 56*a* thereof. The locking unit 56*a* does not comprise any externally visible elements. Instead, in a fastened state, the frame 20*a* completely covers the locking unit 56*a*. Therefore, it is not possible to see from outside how the frame 20*a* is fastened.

Similarly to above, the locking unit 56*a* comprises openings 58*a*, 60*a* which align with one another in the fastened state. In this case, the frame 20*a* comprises a lug 74*a* in which a first opening 58*a* of the two openings 58*a*, 60*a* is formed. A locking state can be produced in that a blocking element (not shown) is pushed through the openings 58*a*, 60*a*. A blocking element of this type can be, for example, a pin.

Figure 6:
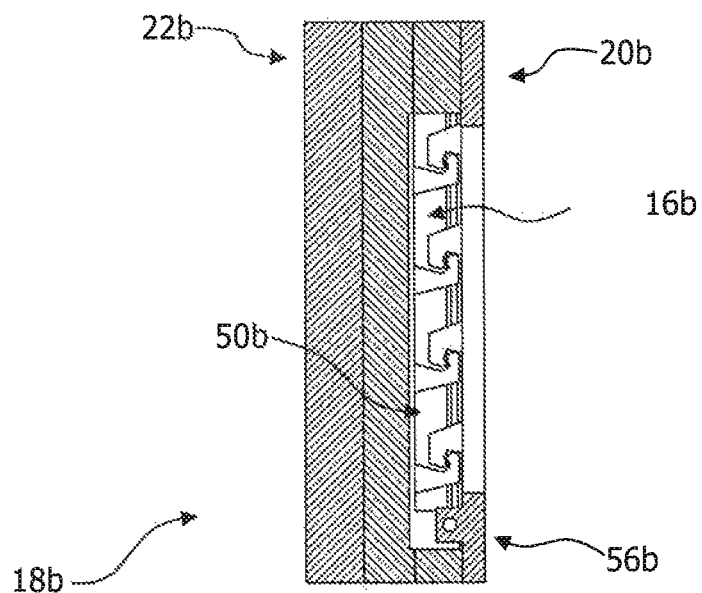
FIG. 6 is a sectional view of a fastening system according to a third embodiment.

FIG. 6 is a sectional view of a fastening system 18*b* according to a third embodiment. The fastening system 18*b* likewise comprises a wall portion 22*b* of a monument (not shown) and a frame 20*b* and is configured to attach a fixture 16*b* to the monument. In addition, the fastening system 18*b* comprises a locking unit 56*b* which is configured analogously to the locking unit according to the second exemplary embodiment.

However, the fastening system 18b differs from the two preceding exemplary embodiments in that no separate connection members are provided for the fixture 16b. Instead, the fixture 16b is retained exclusively by the frame 20b in a receiving region 50b of the wall portion 22b.

In this case, the fixture 16b can be fastened to the frame 20b, for example bonded and/or screwed thereto. Likewise, it is possible for the fixture 16b to be loosely inserted in the receiving region 50b and, in a fastened state, to be retained by the frame 20b in a stationary manner in the receiving region 50b.

In additional embodiments, latching elements or the like can be provided on the fixture 16b and/or the wall portion 22b which retain the fixture 16b to a minor extent after an insertion in the receiving region 50b so that this fixture does not fall out during the installation of the frame 20b. However, a majority of a retaining force is still applied by the frame 20b.

As has been mentioned above, according to the invention it is also conceivable for no recessed receiving region to be provided in the wall portion. In this case, the frame can form a receiving region of this type, and the fixture can be installed together with the frame. The fixture can then be fastened to the frame for example before an attachment of the frame.

Figure 7:
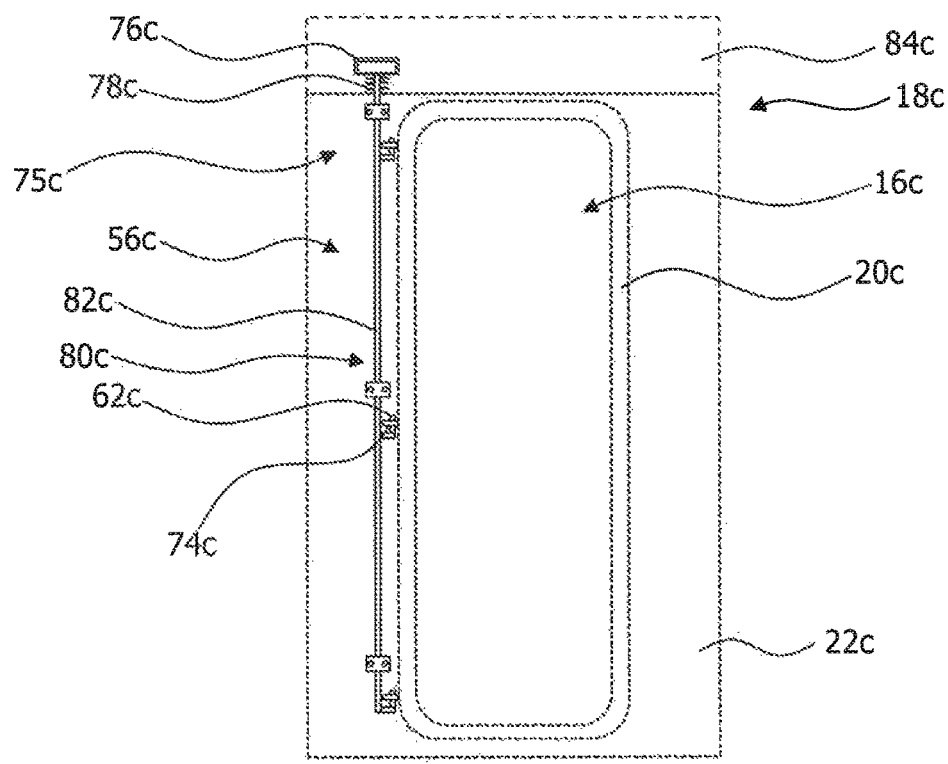
FIG. 7 is a front view of a locking unit according to the invention in a locked state.
Figure 8:
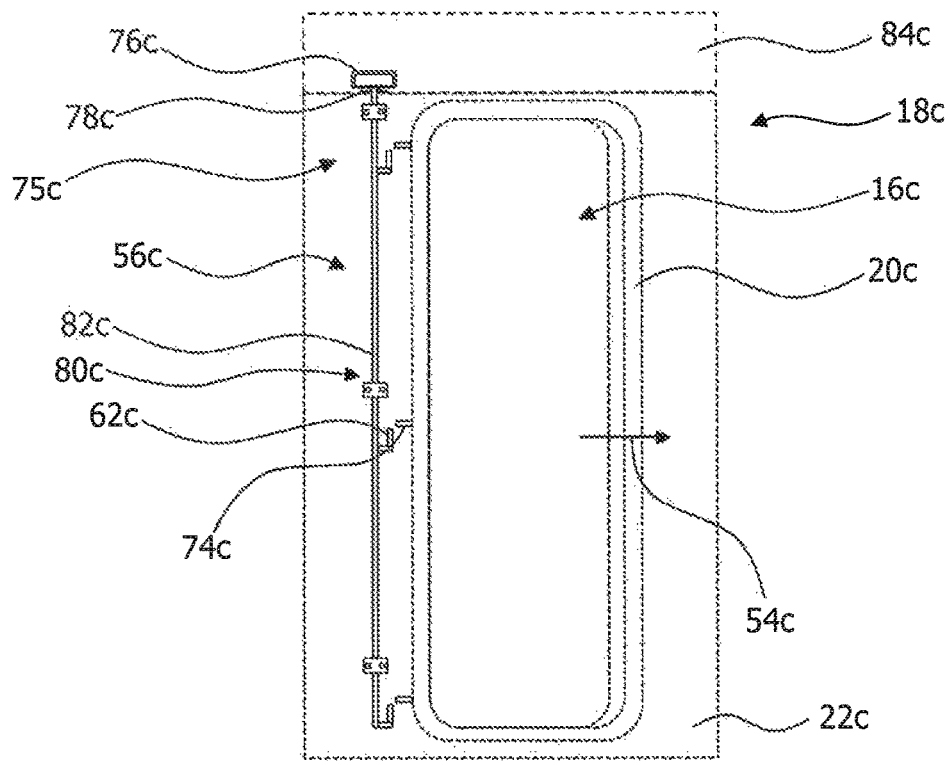
FIG. 8 is a front view of the locking unit in a released state.

Another variant of a locking unit 56c according to the invention of a fastening system will be described in the following. FIG. 7 is a front view of the locking unit 56c in a locked state. FIG. 8 is a front view of the locking unit 56c in a released state. In the following, reference is made to both drawings.

The locking unit 56c is part of a fastening system 18c which, like the fastening systems 18, 18a, 18b from the exemplary embodiments above, comprises a wall portion 22c and a frame 20c and is configured to attach a fixture 16c. The frame 20c has a lug 74c which is provided with an opening (not shown). The locking unit 56c comprises a blocking element 62c which, in a locked state, prevents a movement of the frame 20c parallel to a fastening direction 54c by engaging in the opening. The blocking element 62c is in the form of a pin or peg.

In the case shown, the frame 20c comprises three lugs 74c, and the locking unit 56c comprises three corresponding blocking elements 62c which, for the sake of clarity, are not all provided with reference signs. A different number of elements is also possible.

The locking unit 56c has an actuation mechanism 75c having an actuation member 76c arranged at a distance from the blocking element 62c and a force transmission 80c mechanically coupling the actuation member 76c to the blocking element 62c, wherein the blocking element 62c can be moved by means of the actuation member 76c.

The actuation member 76c is in the form of a hand grip. The force transmission 80c comprises a bar 82c, via which a force applied to the actuation member 76c can be transmitted to the blocking element 62c. The actuation member 76c is attached above the frame 20c and must be moved downwards to release the locking.

The locking unit 56c further comprises a spring element 78c. The actuation member 76c is biased into a locked position by means of the spring element 78c. If the actuation member 76c is released, the blocking element 62c therefore moves through the lug 74c, driven by a spring tension of the spring element 78c, and thus produces the locked state. For a release, the actuation member 76c must be moved against the spring tension of the spring element 78c. When the actuation member 76c is pressed, the frame 20c can be moved parallel to the fastening direction 54c as described above.

The bar 82c and components of the locking unit 56c guiding same are accommodated in the wall portion 22c and cannot be seen from outside. According to the current exemplary embodiment, the fastening system 18c also comprises a screen 84c, which is arranged next to the frame 20c, for example above the frame. The screen 84c is fastened to the wall portion 22c and covers the actuation member 76c. To actuate the locking unit 56c, an operator can reach behind the screen 84c and operate the actuation member 76c.

As has been mentioned above, a force transmission which transmits a tensile force can alternatively also be selected. In this case, a suitable spring element can also be used to produce the locked state automatically.

A locking unit comprising an actuation mechanism can also be used in a fastening system 18, 18a, 18b according to one of the preceding exemplary embodiments. In this case, it may be necessary to adapt the orientation of the corresponding blocking elements and/or an actuation direction and/or a position of the actuation member.

Figures 9, 10:
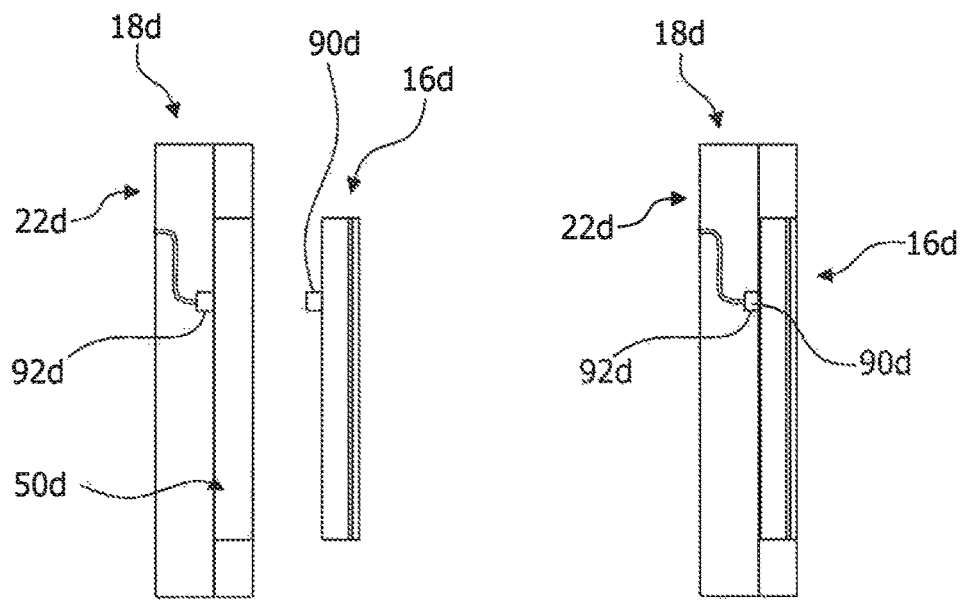
FIG. 9 is a simplified side view of part of a fastening system according to a fourth embodiment before an installation of a fixture.
FIG. 10 is a simplified side view of part of the fastening system according to the fourth embodiment after the installation of the fixture.

One option by way of example for designing a contact member of a fixture 16d is shown in FIGS. 9 and 10. FIG. 9 is a simplified side view of part of a fastening system 18d according to a fourth embodiment before an installation of the fixture 16d. FIG. 10 is a simplified side view of part of the fastening system 18d according to the fourth embodiment after the installation of the fixture 16d. The fixture 16d comprises a connecting element 90d. The connecting element 90d is, for example, an electric plug and/or optical connector.

A wall portion 22d of the fastening system 18d forms a receiving region 50d for the fixture 16d, for example analogously to one of the above-described embodiments. On a rear side of the receiving region 50d, a socket 92d is formed, in which the connecting element 90d can be inserted in order to produce a connection such as an electrical and/or optical connection. In the case shown, the geometry of the connecting element 90d and the geometry of the socket 92d are coordinated in such a way that, when the fixture 16d is inserted in the receiving region 50d, the connection is immediately produced. Likewise, the connection is automatically released when the fixture 16d is removed from the receiving region 50d again, for example during maintenance.

In other embodiments, a plug can also be formed on a wall portion, and a socket can be formed on a fixture. Furthermore, according to the invention, it is conceivable for a short connecting cable (pigtail) to be used, which is guided for example through an opening in a wall portion and subsequently connected.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening system configured to attach a fixture, comprising:
    a wall portion which has at least two first fastening elements;
    a frame which has at least two second fastening elements and which is configured to cover the fixture at least in part in a fastened state; and
    a locking unit which, in a locked state, is configured to prevent a release of the fastened state and, in a released state, is configured to allow the release of the fastened state;
    wherein the at least two first fastening elements and the at least two second fastening elements are configured to engage with one another and be movable relative to one another in a pre-assembled state, and to fix with one another in the fastened state,
    wherein the fastened state can be produced in that, in the pre-assembled state, the frame is moved relative to the wall portion in a fastening direction which extends vertically downward until the at least two first fastening elements engage respective ones of the at least two second fastening elements,
    wherein each of the at least two first fastening elements are displaced from one another along the fastening direction, and wherein each of the at least two second fastening elements are displaced from one another along the fastening direction,
    wherein each of the at least two first fastening elements is oriented in the same direction along the fastening direction, and each of the at least two second fastening elements is oriented in the same direction along the fastening direction,
    wherein the locking unit comprises at least two blocking elements which, in the locked state, mechanically prevents a movement of the frame relative to the wall portion, wherein the at least two blocking elements are oriented perpendicularly to one another,
    wherein the frame has a first opening within an overhanging portion of the frame, and the wall portion has a second opening which is aligned with the first opening, such that the first and second openings extend in the fastening direction, and
    wherein one of the at least two blocking elements extends through the first opening and the second opening, at least in part, in the locked state.

2. The fastening system according to claim 1, wherein the at least two first fastening elements and the at least two second fastening elements are configured to make it possible to produce the pre-assembled state in that the frame is moved towards the wall portion in an assembly direction which extends substantially perpendicularly to a main extension plane of the wall portion.

3. The fastening system according to claim 1, wherein, in the fastened state, at least one of:
    the at least two first fastening elements engages behind the at least two second fastening elements, or
    the at least two second fastening elements engages behind the at least two first fastening elements.

4. The fastening system according to claim 1, wherein at least one of the at least two first fastening elements or the at least two second fastening elements is formed as a hook element.

5. The fastening system according to claim 1, wherein the at least two first fastening elements and the at least two second fastening elements are configured to be released from one another in that, starting from the fastened state, the frame is moved relative to the wall portion counter to the fastening direction.

6. The fastening system according to claim 1, wherein the frame is configured to retain the fixture, at least in part.

7. The fastening system according to claim 1,
    wherein the frame has a third opening,
    wherein the wall portion has a fourth opening which aligns with the third opening in the fastened state, and wherein the fourth opening is misaligned with the third opening in the pre-assembled state, and
    wherein one of the at least two blocking elements extends through the third opening and the fourth opening, at least in part, in the locked state.

8. The fastening system according to claim 1, wherein, in the fastened state, the frame covers the at least two first fastening elements and at least two second fastening elements in an opaque manner.

9. A monument provided for installation in a passenger cabin comprising
    a fastening system according to claim 1, and
    a fixture which is attached via the fastening system.

10. The monument according to claim 9, wherein the fixture comprises a display.

11. The monument according to claim 9, wherein the passenger cabin is a passenger cabin of an aircraft.

12. The monument according to claim 9, wherein the fixture further comprises two connection members which are introduced into corresponding receptacles of the wall portion.

13. A method for attaching a fixture to a monument provided for installation in a passenger cabin via a fastening system which includes a wall portion of the monument which has at least two first fastening elements, and a frame which has at least two second fastening elements and which is configured to retain the fixture, at least in part, in a fastened state, comprising the steps of:
    producing a pre-assembled state in which the at least two first fastening elements and the at least two second fastening elements engage with one another and are movable relative to one another;
    moving the frame in the pre-assembled state relative to the wall portion in a fastening direction which extends vertically downward until the at least two first fastening elements engage respective ones of the at least two second fastening elements to produce the fastened state in which the at least two first fastening elements and the at least two second fastening elements fix with one another; and
    locking, with a locking unit, the frame and the wall portion;
    wherein each of the at least two first fastening elements are displaced from one another along the fastening direction, and wherein each of the at least two second fastening elements are displaced from one another along the fastening direction,
    wherein each of the at least two first fastening elements is oriented in the same direction along the fastening direction, and each of the at least two second fastening elements is oriented in the same direction along the fastening direction,
    wherein the locking unit comprises at least two blocking elements which, in the locking step, mechanically prevents a movement of the frame relative to the wall portion, wherein the at least two blocking elements are oriented perpendicularly to one another, wherein the frame has a first opening within an overhanging portion of the frame, and the wall portion has a second opening which is aligned with the first opening, such that the first and second openings extend in the fastening direction, and wherein one of the at least two blocking elements extends through the first opening and the second opening, at least in part, in the locked state.

14. A fastening system attaching a fixture to a monument provided for installation in a passenger cabin, comprising:

the monument which has a wall portion with at least two first fastening elements;

a frame which has at least two second fastening elements and which is configured to cover the fixture at least in part in a fastened state; and a locking unit which, in a locked state, is configured to prevent a release of the fastened state and, in a released state, is configured to allow the release of the fastened state;

wherein the at least two first fastening elements and the at least two second fastening elements are configured to engage with one another and be movable relative to one another in a pre-assembled state, and to fix with one another in the fastened state, wherein, in the pre-assembled state, the frame is moved relative to the wall portion in a fastening direction which extends vertically downward until the at least two first fastening elements engage respective ones of the at least two second fastening elements, and wherein each of the at least two first fastening elements are displaced from one another along the fastening direction, and wherein each of the at least two second fastening elements are displaced from one another along the fastening direction, wherein each of the at least two first fastening elements is oriented in the same direction along the fastening direction, and each of the at least two second fastening elements is oriented in the same direction along the fastening direction, wherein the locking unit comprises at least two blocking elements which, in the locked state, mechanically prevents a movement of the frame relative to the wall portion, wherein the at least two blocking elements are oriented perpendicularly to one another, wherein the frame has a first opening within an overhanging portion of the frame, and the wall portion has a second opening which is aligned with the first opening, such that the first and second openings extend in the fastening direction, and wherein one of the at least two blocking elements extends through the first opening and the second opening, at least in part, in the locked state.

* * * * *